(12) United States Patent
Becker et al.

(10) Patent No.: US 7,847,446 B2
(45) Date of Patent: Dec. 7, 2010

(54) MAGNET COMPONENT FOR ATTACHMENT TO A SHAFT

(75) Inventors: Joachim Becker, Hohenhameln (DE); Robert Maly, Hildesheim (DE); Dirk Bergmann, Braunschweig (DE); Mirco Beier, Gronau (DE)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 12/093,371

(22) PCT Filed: Nov. 9, 2006

(86) PCT No.: PCT/EP2006/068256

§ 371 (c)(1),
(2), (4) Date: May 12, 2008

(87) PCT Pub. No.: WO2007/079996

PCT Pub. Date: Jul. 19, 2007

(65) Prior Publication Data
US 2008/0272660 A1   Nov. 6, 2008

(30) Foreign Application Priority Data
Dec. 28, 2005   (DE) .................. 10 2005 062 784

(51) Int. Cl.
*H02K 11/00* (2006.01)

(52) U.S. Cl. ..................................... 310/68 B
(58) Field of Classification Search ............... 310/68 B, 310/156.22, 156.28, 156.31
See application file for complete search history.

(56) References Cited

U.S. PATENT DOCUMENTS

| 4,952,830 | A | * | 8/1990 | Shirakawa ................. 310/68 B |
| 6,043,645 | A | * | 3/2000 | Oudet et al. ............. 324/207.2 |
| 6,198,372 | B1 | | 3/2001 | Schwarz |
| 6,462,450 | B1 | * | 10/2002 | Haussecker et al. .... 310/156.09 |
| 6,693,422 | B2 | * | 2/2004 | Lutz ........................ 324/207.2 |
| 2003/0168925 | A1 | | 9/2003 | Bernreuther et al. |

FOREIGN PATENT DOCUMENTS

| DE | 198 48 081 | 3/2000 |
| DE | 101 52 151 | 5/2003 |
| EP | 0 986 159 | 3/2000 |
| EP | 1 498 911 | 1/2005 |

* cited by examiner

*Primary Examiner*—Nguyen N Hanh
(74) *Attorney, Agent, or Firm*—Michael J. Striker

(57) ABSTRACT

The invention relates to a magnet module for fixing to a shaft (4), said module comprising a magnet holder (8) consisting of an injection moulded plastic material, and a magnet element (9). The magnet holder (8) and magnet element (9) are embodied as separate components, the magnet element (9) being injected into the plastic material of the magnet holder (8) and the magnet holder (8) being connected to the shaft (4).

14 Claims, 2 Drawing Sheets

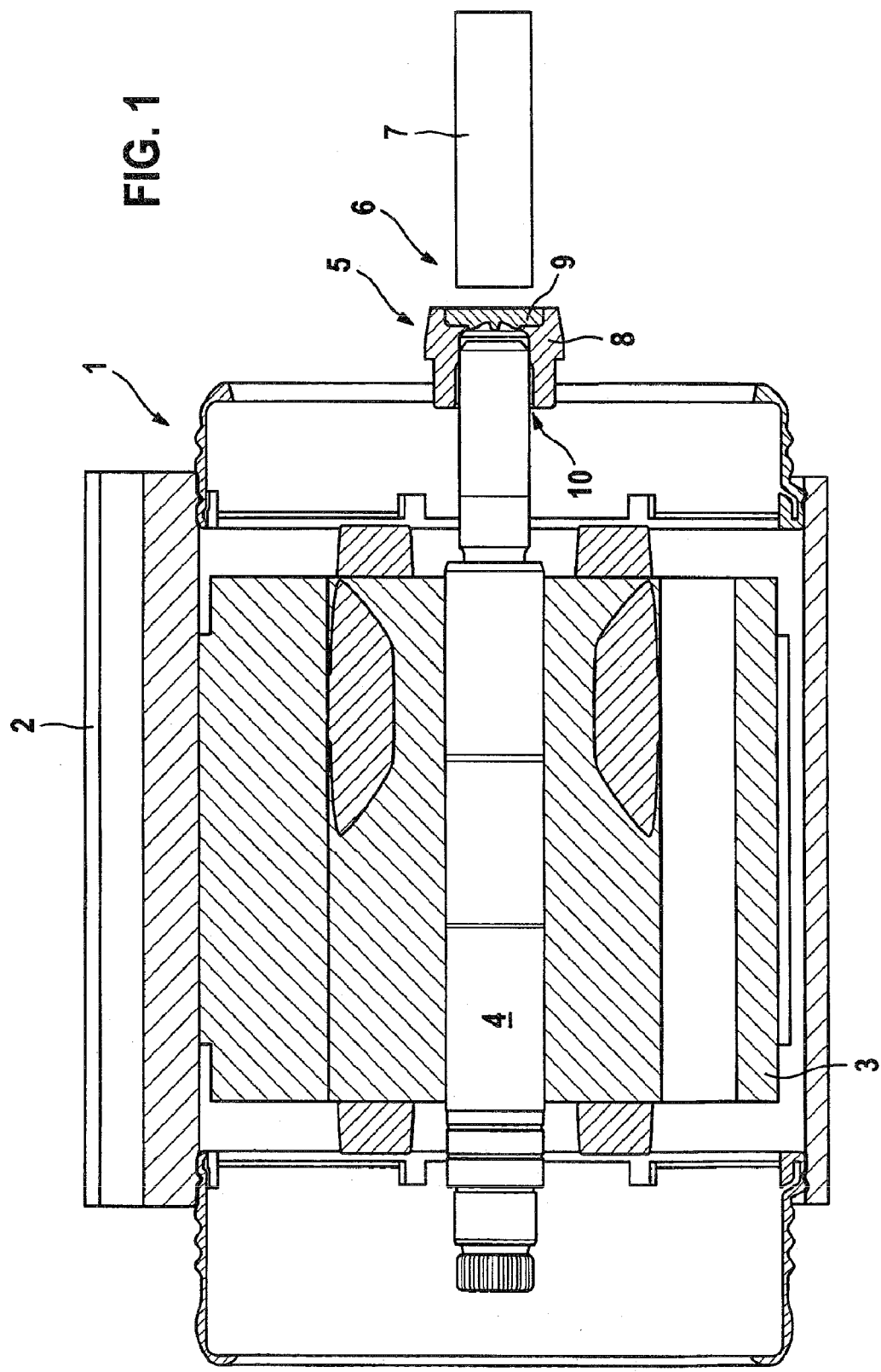

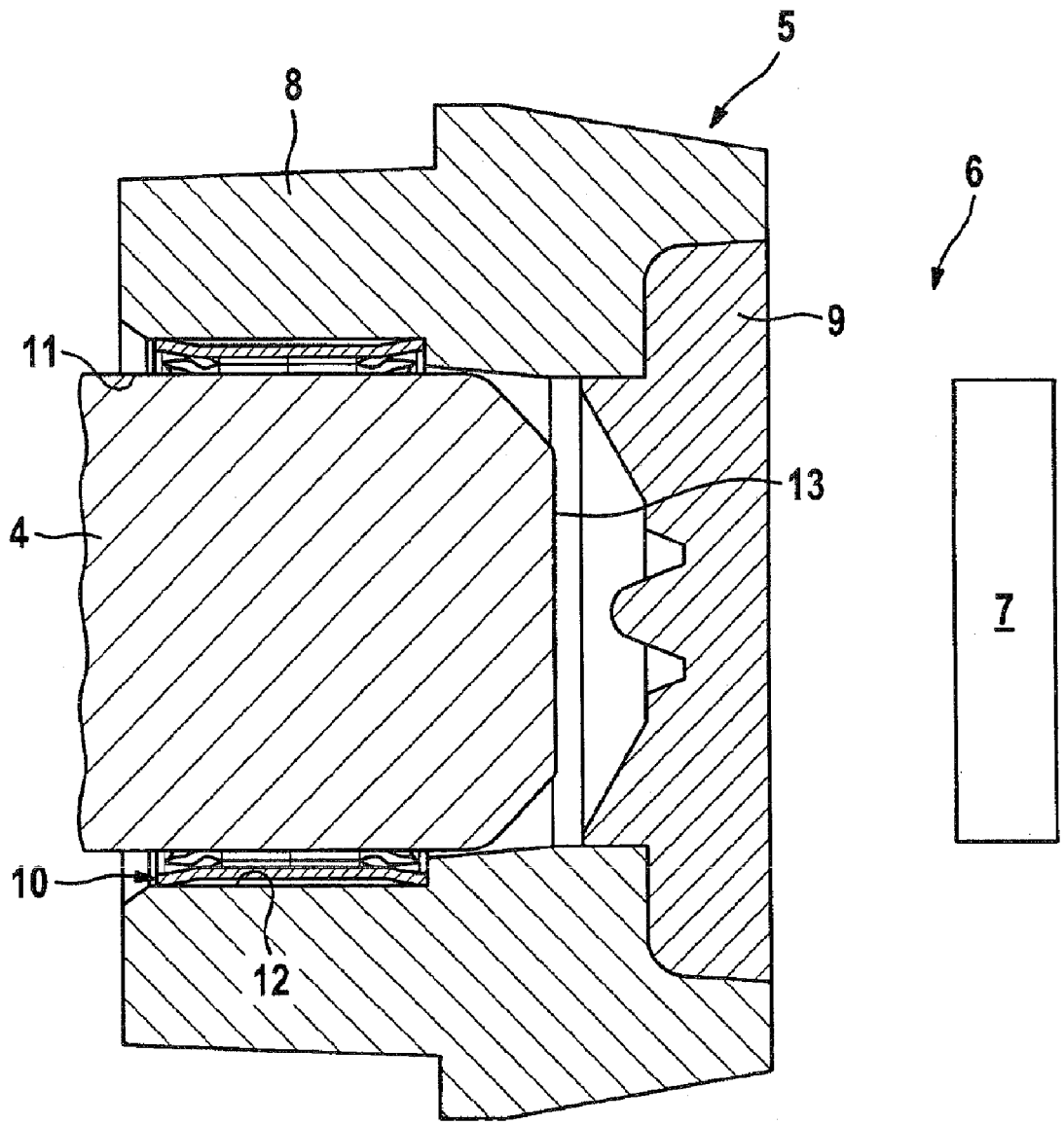

MAGNET COMPONENT FOR ATTACHMENT TO A SHAFT

CROSS-REFERENCE TO RELATED APPLICATION

The invention described and claimed hereinbelow is also described in German Patent Application DE 10 2005 062 784.6 filed on Dec. 28, 2005. This German Patent Application, whose subject matter is incorporated here by reference, provides the basis for a claim of priority of invention under 35U.S.C. 119(a)-(d).

BACKGROUND OF THE INVENTION

The present invention relates to a magnet component for attachment to a shaft.

EP 1,498,911 A1 has disclosed an annular magnet for attachment to an armature shaft, which is part of an electromotive actuator unit. The annular magnet is supported in a rotationally fixed fashion on the armature shaft and, together with a sensor, performs the function of a position detection device in which as the armature shaft rotates, the associated sensor registers a magnetic field change induced by the annular magnet, thus making it possible to determine how far the armature shaft has rotated. For attachment to the armature shaft, the annular magnet has a central opening with which the magnet is slid onto the shaft. Radial projections are formed onto the inner surface of the opening and secure an elastic clamping element that serves to affix the annular magnet onto the shaft.

The annular magnet is manufactured using the plastic injection molding method; uniformly distributed magnetizable particles are added into the plastic compound and after execution of the injection molding, can be magnetized with the aid of an impressing magnet in accordance with a predetermined pattern.

SUMMARY OF THE INVENTION

The object of the invention is to disclose a magnet component that can be manufactured through simple means and in a flexible fashion and is designed to be fastened to a shaft.

The novel magnet component includes a magnet holder and a magnet element that are embodied as separate components. The magnet holder is manufactured using the plastic injection molding method in which the at least one magnet element is injection molded into the plastic material of the magnet holder. The magnet holder and magnet element are clearly delineated separate components that can each be adapted to their own intended use. This results in a very flexible use and adaptation, thus making it possible to reduce manufacturing costs. It is advantageous that the plastic material of the magnet holder that is to be processed using the injection molding method does not require any magnetizable additives; the magnetic properties come from the magnet element, which is accommodated as an independent element inside the magnet holder. It is also easily possible to carry out an adaptation to the given conditions with regard to the required magnetic properties, for example the magnet strength or the magnetic impression pattern in the magnet element.

The magnet element, which is suitably embodied in the form of a disk, can be axially situated directly in front of an end surface of the shaft. The magnet holder is advantageously embodied in a hollow cylindrical fashion in the form of a sleeve whose one end surface is constituted by the magnet element, thus yielding a cup-shaped magnet component that includes the magnet holder and magnet element. The magnet holder is slid onto the shaft so that a central opening in the magnet holder rests flush against the circumference surface of the cylindrical shaft.

In this case, it can be advantageous to provide a spring element on the inner circumference surface of the cylindrical recess in the magnet holder, which spring element produces a spring force oriented transversely in relation to the shaft axis and supports the magnet holder in relation to the shaft circumference. The spring element also has a tolerance-compensating action in that different thermal expansions of the shaft and magnet holder are compensated for, which can likewise lead to a gap formation between the cooperating circumference surfaces of the recess and the shaft. The spring element is in particular embodied in the form of a tolerance ring that is suitably inserted into an insertion groove that is let into the circumference surface of the cylindrical recess of the magnet holder. The tolerance ring in this case encloses the shaft in the circumference direction.

The magnet component is suitably part of a position detecting device for determining the current angular position of the shaft. In addition to the magnet component with the magnet holder and magnet element, this position detecting device also includes a preferably stationary rotation speed sensor that senses magnetic field changes that are produced by the rotation of the magnet element. By means of an associated evaluation, it is possible to evaluate the sensor signals detected in the rotation speed sensor and to determine associated angular values that represent the current angle position of the shaft.

The magnet component as a part of a position detecting device is advantageously placed onto the armature or rotor shaft of an electric motor.

Other advantages and suitable embodiments can be inferred from the remaining claims, the description of the figures, and the drawings themselves.

BRIEF DESCRIPTION OF THE DRAWINGS

FIG. 1 is a section through an electric motor having a stator and a rotor shaft on whose one end surface a magnet component is situated, which is part of a position detecting device for determining the current angular position of the rotor shaft, FIG. 2 is a section through the end surface of the rotor shaft, with a magnet component mounted onto it, which includes a magnet holder and magnet element, equipped with an associated sensor.

DESCRIPTION OF THE PREFERRED EMBODIMENTS

The electric motor 1 shown in FIG. 1 includes a stator 3 mounted in stationary fashion inside a housing 2 and a rotor shaft 4 rotating therein, which supports a magnet component 5 at one end surface. The magnet component 5 is composed of two parts and includes a magnet holder 8, which is supported in a rotationally fixed fashion on the rotor shaft 4, and a magnet element 9 accommodated in stationary fashion in the magnet holder 8. The magnet holder 8 and magnet element 9 are embodied as separate components. The magnet component 5 as a whole is part of a position detecting device 6, which, in addition to the magnet component 5, is associated with a sensor 7 that is situated in stationary fashion outside of the housing 2 of the electric motor and cooperates with the magnet element 9. When the rotor shaft 4 rotates, the magnet component 5 including the magnet element 9 also turns; the changes in the magnetic field of the magnet element 9 caused by the rotation are detected by the sensor 7 and based on the sensor signals, the rotation of the rotor shaft can be calculated in an evaluation unit that is not shown. The magnet component 5 at the end surface of the rotor shaft 4 protrudes partway out from the housing 2 of the electric motor 1. The magnet element 9, which is located in front of the axial end surface of the rotor shaft and directly adjacent to it, is situated outside of the housing. Since the magnet element 9 is situated outside of the housing 2, no weakening of the magnetic field by the housing 2 should be expected.

For a rotationally fixed securing of the magnet holder 8 to the rotor shaft 4, as can be seen particularly in FIG. 2, a tolerance ring 10 is situated in the region of the inner circumference surface 11 of a central recess in the magnet holder 8 and completely encloses the outer circumference surface of the rotor shaft 4. This tolerance ring 10 has the function of a spring element and produces a radially acting clamping force between the rotor shaft 4 and the magnet holder 8 that is slid onto it. The tolerance ring 10 is inserted into a circumferential insertion groove 12 that is let into the inner circumference surface 11 of the recess in the magnet holder 8. This secures the tolerance ring 10 axially and radially. The tolerance ring 10 can compensate for different amounts of thermal expansion between the rotor shaft 4 and the magnet holder 8.

The magnet holder 8 is embodied in the form of a hollow cylindrical sleeve, which has the magnet element 9 situated at its one end surface. The magnet element 9 completely covers the end surface of the magnet holder 8 and constitutes its bottom; the plane of the suitably disk-shaped magnet element 9 is situated perpendicular to the shaft axis of the rotor shaft 4. The magnet holder 8 is slid partway onto the rotor shaft 4; the magnet holder 8 also protrudes partway beyond the free end surface 13 of the rotor shaft 4. Viewed in the axial direction, the magnet element 9 is situated completely in front of the end surface 13 of the rotor shaft 4. The magnet element 9 has a diameter that is greater than the diameter of the rotor shaft 4.

In an alternative embodiment, however, it can also be suitable to provide the magnet element 9 with a non-round shape, for example a polygonal contour or to let recesses into the magnet element, for example to provide a ring shape. It is also possible for sections of the magnet element 9 to extend partway beyond the circumference surface of the rotor shaft. According to another embodiment, in the case of an annular shape of the magnet element 9, it is also possible for this magnet element to be slid partway or completely onto the rotor shaft 4.

The magnet holder 8 is embodied in the form of an injection molded plastic component manufactured using the injection molding method. After the manufacturing process of the magnet holder 8, the magnet element 9 is injection molded into the material of the magnet holder so that the melting process secures the magnet element 9 in a fixed and in particular rotationally fixed fashion in the magnet holder 8. In particular, the magnet element 9 is composed of a metallic, under some circumstances plastic-bonded, magnetic, or magnetizable material.

After the manufacture of the combined unit composed of the magnet holder 8 and magnet element 9 by means of the injection molding method, the tolerance ring 10 is inserted into the insertion groove 12 that is advantageously let into the inner circumference surface of the recess during the injection molding process itself and therefore in one comprehensive work step. Then the magnet component 5 is slid over the axial end surface 13 onto the outer circumference surface of the rotor shaft 4. The tolerance ring 10 in the insertion groove 12 provides an axially and radially securing clamping force, which attaches the magnet component 5 to the rotor shaft 4 both axially and radially as well as in a fixed fashion in the circumference direction, but can also be detached from it again as needed. The magnet component 5 is slid axially onto the rotor shaft until the magnet element 9 is spaced a short axial distance apart from the end surface 13 of the rotor shaft 4. It can also be suitable, however, for the magnet element 9 to come into direct contact with the end surface 13.

What is claimed is:

1. A magnet component for attachment to a shaft, having a magnet holder (8), which is composed of injection molded plastic and is for attachment to the shaft (4), and having a magnet element (9), wherein the magnet holder (8) and magnet element (9) are separate components, the magnet element (9) is an injection molded component into the plastic of the magnet holder (8), and the magnet holder (8) is attached to the shaft (4), wherein the magnet holder (8) has a cylindrical recess and is supported on the shaft (4) by means of this cylindrical recess, and wherein a spring element (10) is situated on the circumference surface (11) of the cylindrical recess in the magnet holder (8) and produces a spring force transverse to the shaft axis.

2. The magnet component as recited in claim 1, wherein the magnet holder (8) is situated in the vicinity of an end surface (13) of the shaft (4) and the magnet element (9) is situated directly in front of the end surface (13).

3. The magnet component as recited in claim 2, wherein the magnet element (9) is embodied as disk-shaped.

4. The magnet component as recited in claim 1, wherein the span of the magnet element (9) in the radial direction is greater than the diameter of the shaft (4).

5. The magnet component as recited in claim 1, wherein the magnet holder (8) is embodied as hollow and cylindrical.

6. The magnet component as recited in claim 1, wherein the spring element is embodied in the form of a tolerance ring (10) to compensate for different thermal expansions.

7. The magnet component as recited in claim 1, wherein the spring element (10) is inserted into an insertion groove (12) in the circumference surface (11) of the cylindrical recess.

8. A position detecting device equipped with a magnet component as recited in claim 1.

9. An electric motor equipped with a magnet component as recited in claim 1.

10. A method for manufacturing a magnet component as recited in claim 1, in which a magnet holder (8) of the magnet component (5) is manufactured using the plastic injection molding method and a magnet element (9) embodied in the form of a separate component is injection molded into the magnet holder (8).

11. The magnet component as recited in claim 1, wherein the magnet element (9) has a non-round shape.

12. The magnet component as recited in claim 1, wherein the magnet element (9) is an element which is injection molded into a material of the magnet holder (8) by a melting process and thereby secured in a fixed and rotationally fixed fashion in the magnet holder.

13. The magnet component as recited in claim 1, wherein the magnet holder has a form of a sleeve with one end surface constituted by the magnet element, thus forming a cup-shaped magnet component including the magnet holder and the magnet element.

14. An electric motor, comprising a magnet component for attachment to a shaft and a magnet component for attachment to a shaft, having a magnet holder (8), which is composed of injection molded plastic and is for attachment to the shaft (4), and having a magnet element (9), wherein the magnet holder (8) and magnet element (9) are separate components; the magnet element (9) is an injection molded component into the plastic of the magnet holder (8), and the magnet holder (8) is attached to the shaft (4), wherein a magnet component (5) including the magnet holder (8) and the magnet element (9) at an end surface of the rotor shaft (4) protrudes out from a housing (2), and the magnet element (9) is located outside of the housing (2) in front of an axial end surface of the rotor shaft (4) and directly adjacent to it.

* * * * *